United States Patent [19]

Atchley

[11] Patent Number: 4,794,880
[45] Date of Patent: Jan. 3, 1989

[54] GNAW RESISTANT ANIMAL WATER BOTTLE

[76] Inventor: Frank W. Atchley, 461 Walnut St., Napa, Calif. 94558

[21] Appl. No.: 934,352

[22] Filed: Nov. 24, 1986

[51] Int. Cl.$^4$ .............................................. A01K 7/00
[52] U.S. Cl. ................................................. 119/72.5
[58] Field of Search .................... 119/72, 72.5, 75; 215/DIG. 1, 110, 100 A; 220/4 B; 150/55; 206/806; 446/227

[56] References Cited

U.S. PATENT DOCUMENTS

| | | | |
|---|---|---|---|
| 17,668 | 5/1930 | Rosen | 206/806 X |
| 771,768 | 10/1904 | Daughirtai | 446/227 X |
| 1,070,516 | 8/1913 | O'Brien | 220/4 B |
| 1,545,353 | 7/1975 | Rosell et al. | 220/4 B |
| 2,133,411 | 10/1938 | Zohe | 150/55 X |
| 2,607,319 | 8/1952 | Shappee | 119/71 |
| 3,529,575 | 9/1970 | Schalk | 119/72.5 |
| 3,570,718 | 3/1971 | Otsuka | 215/100 A X |
| 4,089,463 | 5/1978 | Babiol | 215/DIG. 1 |
| 4,171,743 | 10/1979 | Mascia et al. | 206/806 X |
| 4,276,989 | 7/1981 | Hicks | 215/DIG. 1 X |
| 4,322,012 | 3/1982 | Conti | 215/DIG. 1 X |
| 4,393,813 | 7/1983 | Sou | 119/72.5 |
| 4,442,947 | 4/1984 | Banich, Sr. | 215/DIG. 1 X |
| 4,579,242 | 4/1986 | Ellis, III | 220/4 B X |

Primary Examiner—Robert Peshock
Assistant Examiner—R. Thomas Price
Attorney, Agent, or Firm—Harris Zimmerman; Howard Cohen

[57] ABSTRACT

A bottle for dispensing water or other liquids to caged animals may be formed of economical, easily fabricated materials such as plastic without being susceptible to damage from gnawing when placed inside the cage. The bottle is suspended from an overhead support and simply swings away in the manner of a pendulum in response to impacts from teeth or claws. The bottle has a continuous, smooth, rounded outer surface which keeps the animal from gripping the bottle in a manner that would enable gnawing.

13 Claims, 1 Drawing Sheet

U.S. Patent  Jan. 3, 1989  4,794,880
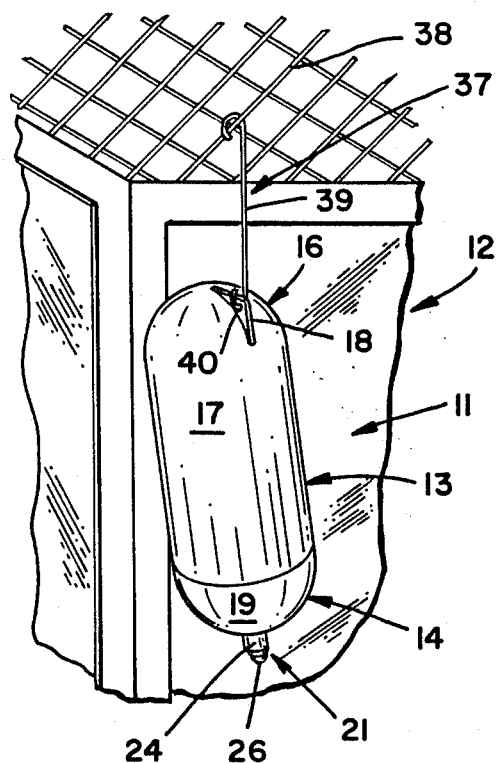
FIG_1
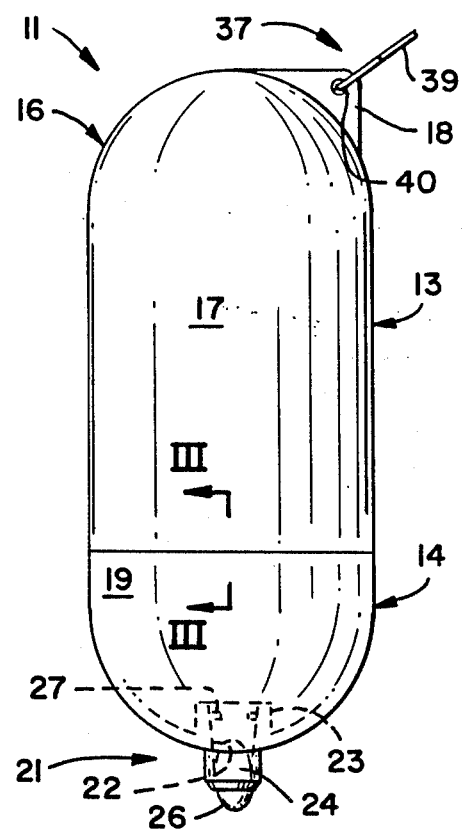
FIG_2
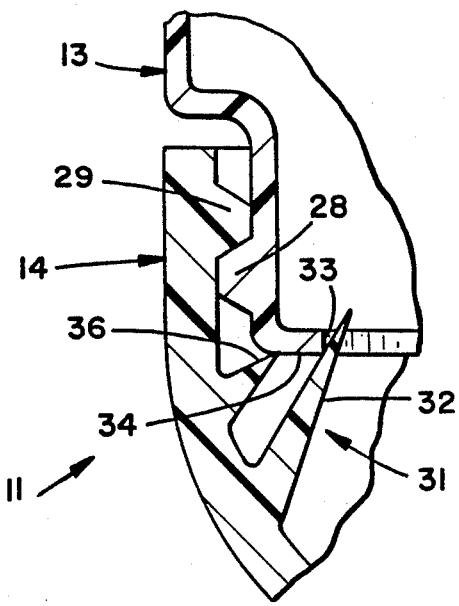
FIG_4
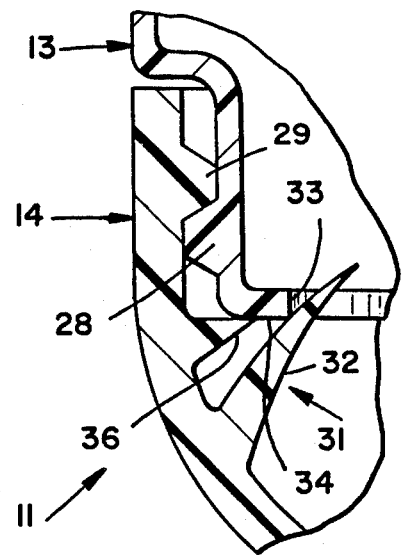
FIG_3

GNAW RESISTANT ANIMAL WATER BOTTLE

TECHNICAL FIELD

This invention relates to animal watering devices and more particularly to containers for dispensing water or other liquids at an animal cage or the like.

BACKGROUND OF THE INVENTION

Caged small animals, such as rats, hamsters or rabbits among other examples, tend to gnaw on objects including their water bottle if it is accessible. Such gnawing can damage or destroy anything but very hard materials. Consequently, watering devices for caged animals must be designed to resist gnawing or be positioned out of reach of the animal.

Water bottles designed for use with mesh walled cages avoid the problem by locating most of the water dispensing structure outside of the cage. A bottle secured to the outside of the cage has a water dispensing tube which extends a short distance into the cage through an opening in the mesh wall. Water bottles of that kind are not compatible with cages which have solid walls of glass or other material and in some situations may be inconvenient with mesh walled cages because of space restrictions or for other reasons. Under those circumstances the water bottle must necessarily be inside the cage where it is exposed to gnawing.

Water bottles formed of metal or thick glass are gnaw resistant but are also undesirably expensive because of the cost of the materials and fabrication costs and/or the need for careful handling to avoid breakage. Cost is a particularly important consideration in the distribution of water bottles for small animal cages. Many purchasers are children or others of limited means. Biological laboratories, zoos and the like may need to purchase such bottles in large quantities and thus must also pay careful attention to cost.

Prior water bottles designed for installation inside a small animal cage or in other situations where the bottle is exposed to gnawing must be formed of costly material such as metal or thick glass if reasonable durability is to be realized. A construction which enabled the water dispenser to be formed of more economical material such as plastics for example, would be highly advantageous from the cost standpoint provided that it resists damage from gnawing.

One solution to this problem in the prior art is to provide a metal guard or shield in conjunction with a bottle formed of soft, inexpensive plastic or the like. Although the guard prevents the animal gnawing on the bottle, it unfortunately provides the animal with the footing and opportunity to climb on the guard and bottle assembly. If there is no top to the animal enclosure, as with terrarium style housings, the animal may escape from atop the bottle assembly. And, of course, the metal guard or shield adds expense to the watering device, as does the cover which is required to keep the animal within the cage.

The present invention is directe to overcoming one or more of the problems discussed above.

SUMMARY OF THE INVENTION

In one aspect, the present invention provides a device for dispensing liquids to animals which includes a bottle having upper and lower end portions and an intermediate portion at least the lower end portion having a rounded configuration with a smooth outer surface. A liquid dispensing outlet nipple is located at the lower end portion of the bottle. The construction further includes suspension means for suspending the bottle from an overhead support to enable swinging movement of the bottle in response to laterally directed forces exerted by an animal.

In another aspect, the invention provides a device for dispensing water or other liquid to a caged animal which includes a bottle having a cylindrical intermediate portion and hemispherical upper and lower end portions which have diameters similar to that of the intermediate portion and which are coaxial with the intermediate portion. The intermediate and upper and lower end portions of the bottle have outer surfaces which jointly define a substantially continuous, smooth, angle-free outer surface of the bottle except at the center of the lower end portion and except at a limited region of the upper end portion. The lower end portion is separable from the intermediate portion and the upper end portion has a lug protuberance at the limited region. A water dispensing nipple protrudes downward from the center of the lower end portion of the bottle. A suspension member has a lower end pivotably coupled to the lug protuberance and has means for engaging the upper end of the member on an overhead support.

A water dispenser embodying the invention may be formed at least largely of economical materials such as plastic without being susceptible to damage from gnawing when it is situated inside an animal cage. The suspended bottle simply swings away in the manner of a pendulum in response to impacts from an animal's teeth or claws. The smooth, rounded outer surface prevents the animal from seizing the bottle with jaws or claws and thereby obtaining sufficient purchase to enable gnawing. In a preferred form of the invention means are also provided which very effectively seal the bottle without using exposed sealing elements that might be damaged by gnawing.

The present invention also overcomes the problem of the animal climbing onto the watering bottle. Due to the fact that the claws cannot gain footing on the smooth contours of the bottle, and that the pendulum suspension of the bottle prevents the animal from jumping onto the bottle, the animal cannot support itself on the bottle and cannot escape from the cage. The cages without tops can be used, metal gnawing guards can be eliminated, and the animal cage can be installed at greatly reduced cost.

BRIEF DESCRIPTION OF THE DRAWINGS

FIG. 1 is a perspective view of the preferred embodiment of the invention shown suspended within an animal cage.

FIG. 2 is an elevation view of the water bottle of FIG. 1 shown apart from the cage.

FIG. 3 is a section view of a portion of the water bottle taken along line III—III of FIG. 2.

FIG. 4 is another section view of the portion of the device that is depicted in FIG. 3 but showing components at an intermediate stage of engagement.

DETAILED DESCRIPTION OF THE PREFERRED EMBODIMENT

Referring initially to FIG. 1 of the drawing, a water bottle 11 in accordance with this embodiment of the invention is particularly suited for disposition inside an animal cage 12 but may also be used to dispense water to uncaged animals if desired. While the bottle 11 was designed primarily for dispensing water, it may also be used to provide animals with other liquids such as medications or dietary supplements for example.

Bottle 11 is primarily a container having a cylindrical intermediate portion 13 situated between hemispherical upper and lower portions 14 and 16 respectively, which portions 13, 14 and 16 are coaxial and have the same diameter. The lower portion 14 is separable from the intermediate and upper portions 13 and 16, to enable filling of the bottle 11, in a manner which will hereinafter be described in more detail.

Intermediate portion 13 and upper portion 16 are a single integral element in this example and have a continuous, smooth rounded outer surface 17 which is free from projections and angles except for a small suspension lug protuberance 18 on the upper portion. The separable lower portion 14 also has a smooth, rounded outer surface 19 which is effectively continuous with the outer surface 17 of portions 13 and 16 when the bottle 11 is in the assembled condition. Surface 19 of lower portion 14 is also free of angles and protuberances except at the center of the lower end of portion 14 where a water dispensing nipple assembly 21 extends downward for a short distance.

Lower portion 14 has a small opening 22 at the center and is formed with an annular lip 23 which extends a short distance upwardly from the rim of the opening. Nipple assembly 21 includes a tapered sleeve 24 which seats in lip 23 and extends a short distance downward from portion 14 through opening 22. An ellipsoidal valve element 26 seats within the lower region of sleeve 24 and normally prevents water outflow except when it is raised slightly by nuzzling motions of an animal seeking water. Inwardly extending tangs 27 near the upper end of sleeve 24 keep the valve element 26 from being lifted out of the sleeve.

Referring now to FIGS. 3 and 4 in conjunction, intermediate portion 13 and lower portion 14 of the bottle 11 are provided with male and female threads 28 and 29 respectively which secure the components together while enabling temporary separation for filling, refilling and cleaning of the bottle. Sealing means 31 are provided to avoid leakage and may advantageously be of the double sealform described in my copending application Ser. No. 875,963, filed June 19, 1986. In particular, a first annular resilient sealing lip 32 extends upwardly and radially inwardly from the inner surface of the lower end portion 14 of the bottle 11. Lip 32 is proportioned to enter the circular opening 33 at the base of intermediate portion 13 as threads 28 and 29 are being engaged, as shown in FIG. 4 in particular, and to be deflected radially inwardly by a shoulder 34 which encircles the opening, as shown in FIG. 3, as the engagement of portion 14 on portion 13 is completed. The first sealing lip 32 thus functions as a guide during the engagement process and then acts to suppress leakage from opening 33.

A second, shorter, annular resilient sealing lip 36 of greater diameter than lip 32 extends upwardly and radially inwardly from the inside surface of end portion 14 and is proportioned to contact shoulder 34 and to be deflected slightly by the shoulder as engagement of portion 14 on portion 13 is completed. The second sealing lip 36 provides a back-up sealing action which assures that leakage will not occur at the juncture between portions 13 and 14. Sealing lips 32 and 36 may be formed integrally on lower end portion 14 if the end portion is made of slightly resilient material such as most plastics.

Referring again to FIG. 1, the bottle 11 is provided with suspension means 37 for suspending the bottle from an overhead support 38 to enable swinging movement of the bottle in response to laterally directed forces exerted by an animal. In the present example, the overhead support 38 is a wire mesh cover of the cage 12 although other support structure may be utilized if the cage has a different construction.

The previously described lug protruberance 18 is a component of suspension means 37 in this embodiment and is transpierced by an aperture 40. A suspension member 39 which is preferably a length of metal wire has a lower end portion which is looped to extend through aperture 40 and then back against itself to form a pivotable coupling between the bottle 11 and suspension member. The upper end of the suspension member 39 is formed into a hook 41 suitable for engagement with the overhead support 38 and which forms a second pivotable connection.

While the lug protruberance 18 can be centered on the upper portion 16 of the bottle 11 and extend a short distance upward, it is advantageous for packaging and shipping purposes if it extends radially. This reduces packing space and the lug 18 does not then tend to penetrate wrappings. The lug 18 is also less exosed to breakage.

Sleeve 24 and valve element 26 of the nipple assembly 21 and suspension member 39 are preferably formed of hard metal, to resist gnawing, although this is not essential in all cases. The other portions of the bottle 11 may advantageously be formed of low cost and easily fabricated non-metallic material such as any of various known plastics. The smooth rounded configuration of the bottle 11 together with the pendulum like suspension means 37 protect the bottle from damage by the animal notwithstanding the fact that most plastic materials can be gnawed under other circumstances.

Gnawing of any but an extremely soft object by an animal generally requires that it be fixed in position or that it be grippable by the jaws or paws of the animal. The herein described water bottle 11 lacks those characteristics if it is suspended in a cage 12 or the like away from the cage walls in spaced apart relationship from the floor of the cage. The bottle 11 simply swings away if the animal attempts to penetrate its teeth into the bottle surface or to grasp the bottle with its claws. The bottle 11 configuration is free of projections, corners or other geometrical discontinuities of the kind that can be gripped except at nipple 21 which is formed of hard metal and at lug 18 which is relatively inaccessible and which is protected to a considerable extent by the metal of suspension member 39.

While the invention has been described with respect to a single preferred embodiment, many modifications of the structure are possible and it is not intended to limit the invention except as defined in the following claims.

I claim:
1. In a device for dispensing liquids to animals, the combination comprising:
   a bottle for containing the liquid and suspension means for suspending said bottle within a cage.
   means for preventing the animal climbing on or gnawing on said bottle or said suspension means, including said bottle having upper and lower end portions and an intermediate portion therebetween, said upper, lower, and intermediate portions having a rounded configuration with a smooth outer surface, a liquid dispensing outlet nipple located at said lower end portion of said bottle, said means for preventing the animal climbing on or gnawing on said bottle or said suspension means further including a suspension member having a lower end pivotably coupled to an upper end portion of said bottle to eliminate the animal climbing onto the bottle, and means for engaging the upper end of said suspension member on an overhead support.

2. The device of claim 1 wherein said lower end portion of said bottle has a substantially hemispherical outer surface.

3. The device of claim 2 wherein said intermediate portion of said bottle is annular and has a smooth outer surface, said outer surfaces of said intermediate portion and said lower end portion being of the same diameter at the adjoining regions thereof.

4. The device of claim 3 wherein said upper end portion of said bottle also has a substantially hemispherical outer surface, said outer surfaces of said upper end portion and said intermediate portion being of the same diameter at the adjoining regions thereof.

5. The device of claim 1 wherein said nipple protrudes downwardly from a centered position on said lower end portion of said bottle.

6. The device of claim 1 wherein said suspension means includes a metal rod having a lower end coupled to said upper end portion of said bottle, the upper end of said rod having means for establishing a pivotable connection of said rod to an overhead support.

7. The bottle of claim 6 wherein said rod is pivotably coupled to said upper end portion of said bottle.

8. The device of claim 1 wherein said upper end portion of said bottle has a substantially hemispherical configuration and wherein said suspension means includes a lug extending radially from said upper end portion of said bottle at one side of the uppermost point thereon, and means for coupling said lug to an overhead support in downwardly spaced relationship therewith.

9. The device of claim 1 wherein said lower end portion of said bottle is separable from said intermediate portion and upper end portion thereof and is engaged on said intermediate portion by threads.

10. The device of claim 9 wherein said intermediate portion of said bottle has an annular shoulder at the bottom thereof encircling an opening thereat and wherein said lower end portion of said bottle has a first annular resilient sealing lip which extends upwardly and radially inwardly from the inner surface of said lower end portion and which is proportioned to enter said opening and to be deflected radially inwardly by said shoulder as said lower end portion is being engaged on said intermediate portion, said lower end portion of said bottle having a second annular resilient sealing lip which extends upwardly and radially inwardly from said inner surface, said second sealing lip being of greater diameter than said first sealing lip and being proportioned to contact said shoulder and to be deflected radially inwardly thereby as said lower end portion is being engaged on said intermediate portion.

11. The device of claim 1 wherein said bottle is formed of plastic material and said nipple is formed of metal.

12. The device of claim 1 further including a normally closed valve in said nipple, said valve having means for enabling opening thereof by an animal.

13. A device for dispensing water or other liquid to a caged animal comprising:

a bottle for containing the liquid and suspension means for suspending said bottle within a cage, means for preventing the animal climbing on or gnawing on said bottle or said suspension means, including said bottle having a cylindrical intermediate portion and hemispherical upper and lower end portions which have diameters similar to that of said intermediate portion and which are coaxial therewith, said intermediate and upper and lower end portions having outer surfaces which jointly define a substantially continuous, smooth, angle-free outer surface of said bottle, except at the center of said lower end portion and except at a limited region of said upper end portion, to prevent the animal from seizing the bottle with jaws or claws, said lower end portion being separable from said intermediate portion and said upper end portion having a lug protuberance at said limited region thereof, a water dispensing nipple protruding downward from said center of said lower end portion of said bottle, said means for preventing the animal climbing on or gnawing on said bottle or said suspension means further including a suspension member having a lower end pivotably coupled to said lug protuberance to eliminate the animal climbing onto the bottle, and means for engaging the upper end of said suspension member on an overhead support.

* * * * *